(12) United States Patent
Sagar et al.

(10) Patent No.: US 7,634,583 B2
(45) Date of Patent: Dec. 15, 2009

(54) SYSTEMS AND METHODS THAT UTILIZE PERSISTED PUSH/PULL STATE TO PROVIDE RELIABLE MESSAGE PUBLISHING

(75) Inventors: Akash J. Sagar, Redmond, WA (US); Kevin B. Smith, Sammamish, WA (US); Jean-Emile Elien, Bellevue, WA (US); Johannes Klein, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/739,771

(22) Filed: Dec. 18, 2003

(65) Prior Publication Data

US 2005/0138112 A1  Jun. 23, 2005

(51) Int. Cl.
*G06F 15/16* (2006.01)
(52) U.S. Cl. ...................... 709/250; 709/203
(58) Field of Classification Search ................ 709/205, 709/230, 250, 203; 707/1, 2
See application file for complete search history.

(56) References Cited

U.S. PATENT DOCUMENTS

| | | | |
|---|---|---|---|
| 5,625,811 A | | 4/1997 | Bhide et al. |
| 5,675,791 A | | 10/1997 | Bhide et al. |
| 5,920,873 A | * | 7/1999 | Van Huben et al. ......... 707/202 |
| 5,950,201 A | * | 9/1999 | Van Huben et al. ........... 707/10 |
| 6,044,205 A | * | 3/2000 | Reed et al. .................. 709/201 |
| 6,044,367 A | * | 3/2000 | Wolff ............................. 707/2 |
| 6,282,563 B1 | | 8/2001 | Yamamoto et al. |
| 6,289,382 B1 | * | 9/2001 | Bowman-Amuah ......... 709/226 |
| 6,324,581 B1 | * | 11/2001 | Xu et al. ...................... 709/229 |
| 6,356,933 B2 | * | 3/2002 | Mitchell et al. ............. 709/203 |
| 6,578,068 B1 | * | 6/2003 | Bowman-Amuah ......... 709/203 |
| 6,640,247 B1 | | 10/2003 | Kishi |
| 6,801,949 B1 | * | 10/2004 | Bruck et al. ................. 709/232 |
| 2001/0010046 A1 | * | 7/2001 | Muyres et al. ................ 705/52 |

OTHER PUBLICATIONS

Erhard Rahm. Concurrency and coherency control in database sharing systems. Technical Report ZRI-3/91, Department of Computer Science, University of Kaiserslautern, Aug. 1992. 62 pages.
Y. Amir and C. Tutu. From Total Order to Database Replication. In Proc. of International Conference on Distributed Computer Systems (ICDCS), Jul. 2002. 10 pages.

* cited by examiner

*Primary Examiner*—Jeffrey Pwu
*Assistant Examiner*—Gerald Smarth
(74) *Attorney, Agent, or Firm*—Workman Nydegger

(57) ABSTRACT

The present invention relates to systems and methods that facilitate pulling and/or receiving data from a client and posting the data for access by subscribing systems. The systems and methods include a message agent that generates a connection instance that can store connection-related information such as data conveyance state, data identification, and connection identification. Access to the connection instance can be provided to a machine, which can utilize the information to lock the connection and connection instance and begin pulling or receiving data from the client. As the machine pulls or receives data, the data can be published and the connection instance can be concurrently updated to reflect the present state of data conveyance. The information within the connection instance can be utilized to re-establish of severed connection, and to dynamically float the connection between machines to dynamically balance load, ensure reliability and recover from errors.

22 Claims, 11 Drawing Sheets

SYSTEMS AND METHODS THAT UTILIZE PERSISTED PUSH/PULL STATE TO PROVIDE RELIABLE MESSAGE PUBLISHING

TECHNICAL FIELD

The present invention generally relates to databases, and more particularly to systems and methods that dynamically persist state during message conveyance and that utilize the persisted state to recover from conveyance errors and balance conveyance load across servicing machines.

BACKGROUND OF THE INVENTION

Computing and networking technologies have transformed and improved many important aspects of everyday life. For example, various microprocessor-based systems (e.g., desktop computers, laptops, handhelds, PDAs, etc.) have become a staple rather being a luxury, educational tool and/or entertainment center. Such systems can provide users with a mechanism to intelligently, efficiently and economically manage and forecast finances, plan events, control household utilities such as heating, cooling, lighting and security, communicate with others, and store records and images in an essentially permanent medium. Networking technologies (e.g., for intranets, internets and the Internet) can provide users of such microprocessor-based systems with virtually unlimited access to remote systems, information and associated applications from essentially anywhere in the world.

Today's business practices have exploited many of the advantages provided by the continuously evolving computing and networking technologies. For example, a traditional banking transaction can include gathering information such as a bank account number, passbook and identification, dedicating time to travel to the bank, procuring transportation, waiting in line and utilizing a teller to facilitate a banking transaction. Today, a consumer can utilize a personal computer from home to access his/her bank account via the Internet and perform a growing number of available transactions such as balance inquiries, funds transfers, bill payment, on-line credit card applications, mortgage approval, etc. with a click of a mouse button.

In another example, many businesses now provide customers with Web-based product purchasing (e.g., food, clothing, tools, books, etc.), information retrieval (e.g., catalogs, brochures, Web pages, etc.), mail services (e.g., email), nearly real-time technical and customer support (e.g., via instance messaging), interactive gaming, and the like. As incremental advances in computing and networking technologies provide for increased security, bandwidth, data exchange rate and robustness, more and more businesses, consumers, trading partners, subscribers, wholesalers, retailers, entrepreneurs and the like are shifting paradigms and employing computer and network technologies. Thus, many business transactions can be completed by connecting (e.g., via the Internet) to a system that utilizes networked servers and databases, Web sites, and/or on-line services that facilitate the business transaction rather than continuing to rely on traditional business methods.

However, conventional computing and networking systems are susceptible to conditions (e.g., transmission errors and malicious viruses) that can stall and/or terminate a business transaction prior to completion of the transaction. For example, in a typical message publish/retrieval system a network-based connection can be established between a trading partner and a database system with message retrieval capabilities, wherein the trading partner can transmit a message(s) to the database system and/or the database system can retrieve the message(s) from the trading partner. A successfully transferred message(s) can be published, or posted in the database, wherein subscribing systems can access the database and retrieve any published message.

In many instances, message conveyance from the trading partner to the database system can be long-lived and require a reliable connection for a relatively lengthy period of time. Conventionally, when long-lived connections are severed prior to completion of message transfer, message conveyance abruptly terminates. Typically, in order to complete the transaction, another connection has to be established between the trading partner and database system, and message conveyance has to restart. Thus, connection losses in a conventional system can compromise message conveyance reliability. In addition, locking the connection for a relatively long period of time can over-burden a servicing system with processing load.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate receiving a message(s) and publishing the message(s) within a database for retrieval by subscribing components. The systems and methods employ a novel approach wherein the state of data conveyance (via employing a pushing and/or pulling technique) is persisted in order to track data as it is being conveyed from a client to a servicing machine, for example. Persisting state can be achieved by employing a message agent (in connection with the servicing machine) that generates a connection instance that is populated with information related to the connection. Examples of suitable information include a present state of message conveyance, identification of the message being conveyed and a connection ID.

The message agent can provide access to the connection instance to a machine with a suitable adapter, which can lock the connection and connection instance and begin pulling or receiving data from the client. As the machine pulls or receives data from the client, the data can be published in a message box within the database and the connection instance can be concurrently updated to reflect the present state (e.g., acknowledgement and non-acknowledgement) of message conveyance. Thus, at any given moment the connection instance can include at least information pertaining to the present state of message conveyance, the message being conveyed and the connection ID. This information as well as other information associated with the connection instance can be utilized to dynamically float the connection between machines, ensures reliable data conveyance and recover from message conveyance errors.

Conventionally, the state of message conveyance is not persisted. In general, conventional adapters are stateless pipelines so that if a connection is terminated (e.g., voluntarily released and severed due to an error), information related to the message being conveyed, portions of the message that remain to be conveyed and the connection itself is not available. Thus, rather than resuming message conveyance at the point where conveyance was stopped, a new connection is established and message conveyance is restarted.

The systems and methods of the present invention improve upon conventional techniques and mitigate any need to restart message conveyance due to a lost connection via the information stored within the connection instance. For example, if the connection were to terminate, the information within the connection instance can be retrieved and utilized to resume the connection with another machine. For example, the information can be utilized to determine the data that was being conveyed and to determine what portions of the data still need to be conveyed. Message conveyance can then resume from the point where it was stopped by the same machine (e.g., if the connection becomes operable) or by another machine. Thus, the novel aspects of the present invention provide for reliable message conveyance with error recovery.

In addition, the information within the connection instance can be utilized to load balance message conveyance across one or more machines, for example, for a message that requires a long-lived connection. Thus, the load of any machine associated with a suitable adapter can be determined and the connection can be floated to a machine based on load (e.g., present and expected future), and optionally, machine processing power and capacity. For example, a machine presently facilitating message conveyance can voluntarily relinquish the lock on the connection and connection instance and another machine can lock the connection and connection instance, extract information from the connection instance to determine the message being conveyed as well as where to resume message conveyance, and continue message conveyance.

The forgoing can be employed during initialization of the connection and/or at any time (e.g., when errors occur, to balance load, as determine via intelligence, etc.) during message conveyance, and thus can mitigate over-burdening any particular machine. Moreover, the systems and methods of the present invention can be utilized in connection with service windows, wherein the connection instance can be associated with a service window during processing. Upon processing completion, the connection instance can be deleted. For subsequent processing via a service window, a new connection instance can be generated and associated with the new service window.

In one aspect of the present invention, a system that facilitates pushing and/or pulling information from a client to a storage medium is illustrated. The system comprises an interface component that can couple the client to the storage medium via various network protocols. The interface component can be invoked by the client, storage medium and/or a subscriber, wherein invocation can include initiating the connection with the client and commencing receiving and/or pulling information from a client. Upon invocation, the interface component can convey connection-related data to a connection management component that can utilize the data to form an association indicative of the connection.

The association can include data related to the information being transferred, the status of the transfer, transfer conditions, etc. At least a portion of this information along with a connection identity can be conveyed to the interface component, which can lock the connection and association and begin pulling or receiving data, wherein the association can be concurrently updated to reflect the present state of information conveyance. The data within the association can be employed to ensure reliable and efficient information conveyance with error recovery by enabling the connection to be re-established with the present machine and/or floated to another machine employing the interface component wherein information conveyance can resume at the point where it was paused.

In another aspect of the present invention, a system comprising a message agent that facilitates data conveyance between a client and an adapter employed within one or more machines is depicted. When any one the machines is invoked to instantiate a connection with the client, that machine can transmit an identity to the message agent, which can utilize the identity to generate a connection instance for the connection. The connection instance can include the identity as well as other connection-related information. This information can be utilized to locate and lock the connection and commence message pulling. Locking the connection mitigates access to the client by another machine, but in the event that the system crashes, the lock can be acquired by another machine, wherein the connection to the client can be restored. The connection identity can additionally be utilized to track message-pulling status and float the connection between disparate machines. The connection instance can be dynamically updated to reflect transmission progress and store transmission history, for example, which can provide information for dynamic load balancing and error recovery, ensure reliable data conveyance, and support service windows.

In yet another aspect of the present invention, a system that receives pushed messages from a client is illustrated. The system comprises components that provide a gateway to various machines and coordinates data transmission with the machines. The components can facilitate selecting a suitable machine to service the client and storing information related to the connection between the client and machine. When instantiating a connection, the machine can convey information that can be utilized by the components to generate an instance for the connection. The instance can be provided to a selected machine, which can lock the instance and the connection and begin receiving data pushed (e.g., streamed and burst) by the client. The components can dynamically update the instance to reflect the present state of data exchange. In addition, the components can utilize the information within the instance to provide for reliable and efficient data exchange with error recovery.

In still another aspect of the present invention, a system that employs intelligence that facilitates receiving and/or pulling data is illustrated. The intelligence can utilize statistics, probabilities, inferences and/or classifiers to render intelligent decisions. Other aspects of the present invention illustrate methods that can facilitate receiving and/or pulling data from a client and that provide for reliable and efficient data conveyance with error recovery and that can be employed in connection with service windows.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
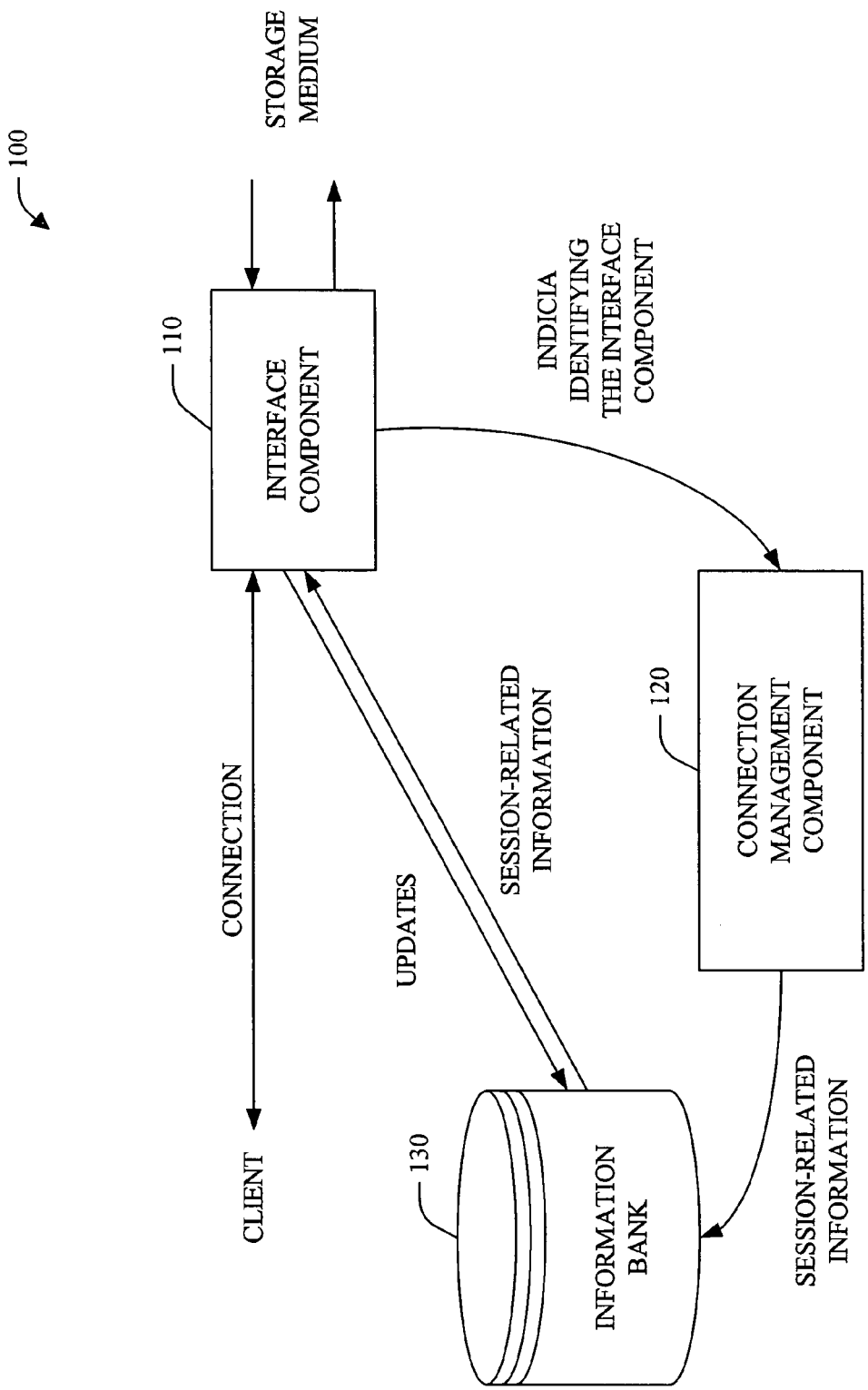
FIG. 1 illustrates an exemplary system that facilitates receiving and/or pulling information from a remote system and storing the information in a medium accessible to subscribing components, in accordance with an aspect of the present invention.

The present invention generally relates to facilitating pulling and/or receiving data from a client and publishing the data so that subscribing systems can retrieve and utilize the data. The systems and methods comprise a message agent that generates an instance for a connection with the client. The connection instance can be utilized to store connection information such as the state of data conveyance, the data being conveyed and a connection ID. Such information can be utilized to monitor the progress of data conveyance. The message agent can provide the instance to a machine, which can lock the connection and instance and begin pulling and/or receiving data from the client. As the machine pulls or receives data from the client, received data can be posted and the connection instance can be concurrently updated to reflect any successful and/or failed data retrievals. Thus, at any given moment the connection instance includes the present state of message conveyance. This information as well as other information within the instance can be utilized to dynamically float the connection between machines, ensure reliable data conveyance, recover from message conveyance errors, and support service windows.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "device," and "machine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be entity (e.g., within a process) that an operating system kernel schedules for execution. Moreover, a component can be associated with a context (e.g., the contents within system registers), which can be volatile and/or non-volatile data associated with the execution of the thread.

FIG. 1 illustrates a system 100 that facilitates pushing and/or pulling information from a remote system (e.g., a client) to a storage medium, in accordance with an aspect of the present invention. The system 100 comprises an interface component 110 that provides a path from the client to the storage medium, a connection management component 120 that facilitates data transfer (e.g., pulled and pushed data) from the client, and an information bank 130 that stores data transfer related information.

The interface component 110 can be utilized to couple the client with the storage medium. Such coupling can be direct and/or through another component(s) (e.g., an API and an adapter), and typically is established in connection with a network such as an intranet, an internet, and the Internet, for example. In general, the interface component 110 can receive and/or transmit information via one or more data transfer protocols, including known network protocols and/or proprietary protocols. Examples of suitable network protocols include, but are not limited to, Transmission Control Protocol/Internet Protocol (TCP/IP), Internet Packet Exchange/Sequenced Package Exchange (IPX/SPX), User Datagram Protocol/Internet Protocol (UPD/IP), etc. as well as protocols that can be employed in connection with the foregoing network protocols such as File Transfer Protocol (FTP), HyperText Transfer Protocol (HTTP), and Simple Object Access Protocol (SOAP).

The protocols associated with and utilized by the interface component 110 can be established during generation of the interface component 110, manually and/or automatically during updating the interface component 110, and/or in real-time (dynamically) and as desired. For example, an Application Programmer Interface (API) can be employed to create the interface component 110, wherein creation can include loading protocol specifications and/or instructions for interpreting such information such that various microprocessor-based machines (e.g., devices, components, etc.) can employ the interface component 110 and communicate with clients via such protocols. APIs can further be utilized to interact with a previously created and/or currently employed interface component 110. For example, stored protocol-related information can be manually edited (e.g., added, changed and removed) via a user and/or automatically updated (e.g., based on need and intelligent decisions) within a machine employing the interface component 110.

The interface component 110 can be invoked by at least the client and/or storage medium (e.g., via a subscriber request). For example, the client can initiate a connection with a machine employing the interface component 110, wherein initiation can include invocation of the interface component 110 within that machine. In another example, the storage medium can initiate a connection between the interface component 110 and the client by transmitting a data transfer message to a machine employing the interface component 110, wherein the message can invoke the interface component 110. It is to be appreciated that an API can be utilized to facilitate the connection and any communication between the client and interface component 110.

Upon invocation via client or storage medium, the interface component 110 can convey information related to the interface component 110 and the machine employing the interface component 110 as well as other information to the connection management component 120. For example, invocation can additionally include providing information regarding at least one of: the client, a data retrieving condition(s), a time-out, the storage medium, a subscriber, and a storage location for retrieved information.

The connection management component 120 can employ such information to associate the client connection and the interface component 110 with a region within the connection information bank 130. This region can be utilized to store data transfer session-related information such as data transfer conditions, data identification, data transfer status, data transfer and connection information bank 130, and read/write privileges, for example. The data transfer conditions can include information regarding when and how long to exchange data. For example, such conditions can define a window of opportunity (e.g., 1 pm, Friday, Oct. 13, 2003) during which data can be transferred. In another example, the conditions can specify a time period within which data can be transferred (e.g., 1 hour). In one instance, data transfer can be completed prior to lapse of such time period. In such cases, the communication channel can be closed upon data transfer completion. In other instances, data transfer can require more time than specified. For these cases, the connection can be refreshed to activate another time period and/or the connection be floated to another machine employing the interface connection 110 that can resume data transfer for a duration defined by the time period. In yet another example, a load threshold can be provided that determines whether to commence, pause, resume and/or halt data transfer on any machine employing the interface component, for example, in order to balance processing across multiple machines, which can mitigate burdening any one machine.

Data identification can be utilized to identify information (e.g., an order series of messages) that is to be and/or is being conveyed. Data transfer status can be utilized to indicate whether information and/or portions thereof have been successfully received and stored and/or failed, for example, during data streaming and/or bursting (e.g., of a file(s) and/or a data packet(s)). In one example, the interface component 110 can provide a non-acknowledgement (NAK) when a transmission fails and/or an acknowledgement (ACK) when a transmission succeeds. The NAK and/or ACK can be utilized to determine whether to resubmit a particular transmission, where to resume data transfer and/or whether transfer is complete. Together, the data transfer status and data identification provide for two tiers of resolution that can be employed in connection to identify the information that is being conveyed and any portions of such information that have been successfully conveyed.

Read/write privileges can be utilized to facilitate selective locking of a data during a data transfer session. For example, the interface component 110 can lock session-related information and the connection during information conveyance such that the only adapter that can access (e.g., edit, view, etc.) the session-related information is the adapter associated with the machine that locked the connection and that the connection cannot be interfered with or interrupted by another machine. In another example, the read/write privileges can be configured to allow viewing access by one or more other devices. Such access enables other machines employing the interface component 110 and/or clients the ability to monitor progress, evaluate performance and render decisions regarding future processing.

At least a portion of the session-related information and a connection identity (e.g., a keep-alive message) can be serially and/or concurrently conveyed to the interface component 110. For example, such information can be stored within the connection information bank 130 and then subsequently transmitted to the interface component 110. In one instance, the connection management component 120 can convey the information to the interface component 110, while in another instance the information can be retrieved from the connection information bank 130. In another example, the information can be conveyed simultaneously (e.g., in parallel) or with a delay (e.g., user specified and physically limited) to the connection information bank 130 and the interface component 110.

As noted above, the interface component 110 can lock the session-related information stored within the connection information bank 130 and the session such that only the interface component 110 employed within that machine can access the session-related information and facilitate conveyance of the information from the client, and other machines employing the interface component 110 can be prevented from accessing the session-related information and exchanging information with the client. Typically, the connection identity is utilized to lock the connection and/or session-related information.

After locking the session, data (e.g., one or messages) can be conveyed between the client and interface component 110. In instances where the client initiates the connection, conveyance typically includes the client pushing information to the interface component 110. As briefly noted above, such pushing can include transmitting information as a stream, a file, a data packet and/or a burst. In instances where the storage medium and/or subscriber initiate the connection, conveyance typically includes pulling information from the client. Likewise, pulling can include transmission via streaming and/or bursting a file and/or data packet. It is to be appreciated that the client can initiate the interface component 110 pulling approach and the storage medium and/or subscriber can initiate the client pushing approach.

For both the pushing and pulling techniques, the interface component 110 can save any received information within the storage medium and concurrently update the session-related information stored within the connection information bank 130. In addition, the session-related information can be concurrently updated upon a transmission failure. Thus, the interface component 110 can update the session-related information to reflect the present state of conveyance. For example, a NAK can be delivered when a transmission fails such that the status within the session-related information indicates that the transmission was attempted and that it failed, and an ACK can be delivered when a transmission succeeds such that the status indicates that the transmission was attempted and that it succeeded. Furthermore, the session-related information can be updated to unlock the connection, indicate that information conveyance is complete, and indicate that conveyance was halted, including providing a reason for halting conveyance.

It is to be appreciated that both the pull and push approaches described above can additionally include capabilities to ensure reliability and efficiency, provide for error recovery and/or accommodate utilization of service windows. For example, reliability and error recovery can be achieved by providing any machine executing the interface component 110 the ability to own the lock on the connection. Thus, if the machine servicing the connection were to become inoperable and/or could not provide the service, another machine employing the interface component 110 can claim ownership to the lock (e.g., via actively pursuing ownership and through assignment) and continue information conveyance. The session-related information can be accessed by the new owner of the lock to determine what information is being conveyed, what portions of the information has been successfully conveyed and what information still needs to be conveyed. Information conveyance can resume where it was interrupted.

Efficiency can be achieved by enabling servicing by more than one machine employing the interface component 110. For example, a load associated with such machines can be utilized to determine whether the present machine should continue conveyance facilitation or whether the connection should be floated to another machine employing the interface component 110 in order to balance the load across machines. If the connection is floated, the session-related information and the lock can be accessed by the new machine in order to resume conveyance where it was suspended, which allows the load on machines to balance over time. In addition, it is to be appreciated that service windows can be supported via allowing the connection identity to be associated with a service window during processing and to be deleted after processing, wherein another connection identity can be generated and associated with the next service window.

Conventional systems generally do not persist state since typical adapters are stateless pipelines. Thus, when a connection associated with a conventional system terminates, a new connection must be established and message conveyance must be restarted in order to process the data transfer. In addition, connections typically cannot be floated to balance load since a machine must release the connection, which leads to a situation similar to the terminated connection described above, wherein message conveyance would have to be restarted. Thus, the systems and methods of present invention improve upon conventional techniques by providing for reliable and efficient data conveyance with error recovery and mitigate any need to restart message conveyance due to lost and/or floating connections.

Figure 2:
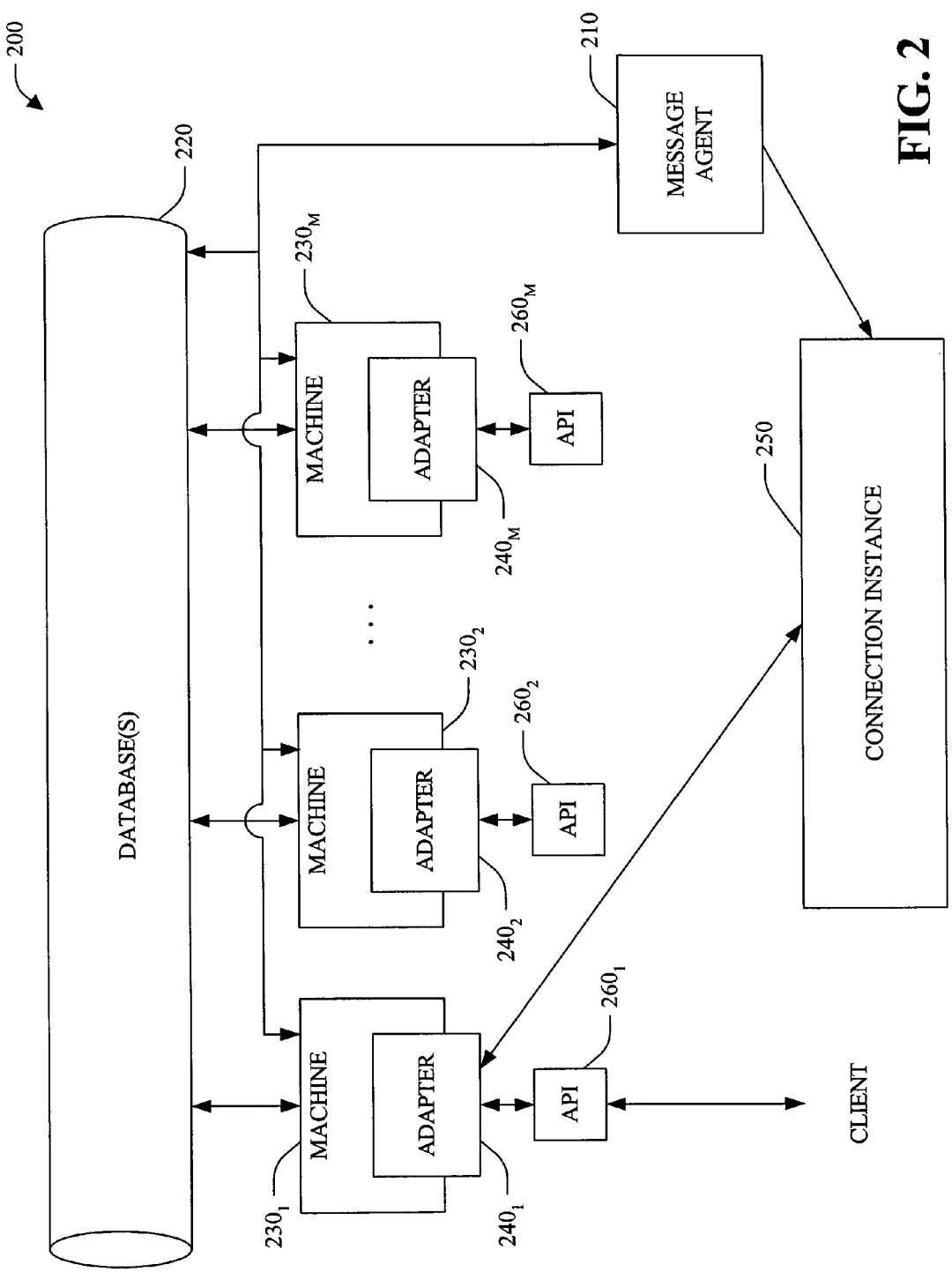
FIG. 2 illustrates an exemplary system that employs a connection instance to facilitate pulling messages, in accordance with an aspect of the present invention.

FIG. 2 illustrates a system 200 that pulls a message from a client, in accordance with an aspect of the present invention. The system 200 comprises a message agent 210 that facilitates communication between the client and a machine with a suitable adapter (e.g., transmission protocol) that can be utilized to facilitate pulling the message from the client. In general, when a message transfer session (e.g., a connection) is initiated, the message agent 210 generates a connection instance for the session. The connection instance can be populated with information indicative of the client, the adapter, the machine and the message(s), and/or a connection ID (e.g., a keep-alive message), for example.

Such information can be utilized to begin message transfer between the client and machine. Furthermore, the connection ID can be utilized to track message transmission and float the connection between suitable adapters residing within different machines. The connection instance can additionally be dynamically updated to reflect transmission progress and provide transmission history. For example, indicia indicative of any portions, including the entire message, that have been transmitted successfully or failed can be associated with the connection instance. Transmission history can include information related to transfer commencement and completion, pauses and resumes, errors, re-submissions, changes in the servicing machine, etc.

By way of example, when a machine with a suitable adapter is invoked to establish a connection between the adapter and a client, the machine can convey machine and/or adapter identity (e.g., a globally unique identity, or GUID) to the message agent 210. The message agent can generate a connection instance for such connection. The connection instance can include the machine and/or adapter identity. Such information can be utilized to locate the desired machine and adapter and/or verify that the desired machine and adapter have been provided with access. If the invocation includes information indicative of the client and/or the message to pull, such information can additionally be included with the connection instance. This information can be utilized to locate and verify the client and message. In addition, the connection ID can be included. The connection ID can be utilized as a key to the connection instance and by the message agent 210 to manage the transfer session.

It is to be appreciated that more than one machine (e.g., machines $230_1$-$230_M$) can include one or more adapters (e.g., adapters $240_1$-$240_M$). For example, a plurality of distributed machines can respectively employ one or more adapters, including similar and/or different adapters. Thus for a given message, one of several machines can be selected to begin message transmission. In addition, more than one machine can contribute to the transfer. For example, one machine can be utilized to begin message transmission and the connection can be subsequently floated to another machine(s) to continue and/or complete the transmission. As described in detail below, such aspects can be utilized to ensure reliability, mitigate transmission and machine errors and provide for efficient distribution of processing across machines. In general, the connection ID stored within the connection instance can be utilized to determine which machine can access the connection instance and pull data from the client. For example, the connection ID can be conveyed to a machine, which can then lock the connection instance and begin message conveyance, wherein only the machine that holds the connection ID can lock and facilitate message transmission. In order for another machine to contribute to message transmission, the connection ID, and hence the lock, can be floated to the other machine.

A connection between the client and a machine can be initiated through a database 220. For example, a component (not shown) subscribed with the database 220 can prompt the database 220 to invoke a machine with a suitable adapter and/or the message agent 210. For example, the component can provide the database with information indicative of the message to retrieve and/or the client. Such information can be utilized to ascertain a suitable adapter and which machine(s) is associated with the suitable adapter. In another example, the database can include a trigger that invokes a machine with a suitable adapter and/or the message agent 210. For example, the trigger can be a signal or message that is transmitted based on criteria such as the time of day, a day of week, and lapse of a time period, for example. It is to be appreciated that the database 220 can be associated with one or more servers.

Such servers can be local and/or remote and can be distributed across similar and/or disparate networks, for example.

As depicted, the database 220 can interact with machines $230_1$-$230_M$ (where M is an integer) and the message agent 210. Thus, the database 220 can be utilized to invoke one or more of the machines $230_1$-$230_M$ and/or the message agent 210. As noted above, a machine with a suitable adapter can be invoked. Thus, if the adapter type can be determined (e.g., the protocol is known or information is provided to ascertain the protocol) from the signal received through the database 220 the machine employing such adapter can be invoked directly and/or through the message agent 210. For example, where the message to be received is associated with a Web-based client, a machine with an HTTP and/or an SOAP-based adapter can be invoked to establish a connection. In addition, other information such as processing load, capacity and power can be utilized to facilitate selecting a machine from a plurality of candidates. If the adapter type cannot be determined from the signal received through the database 220, the signal can be utilized to invoke the message agent 210 which can facilitate selecting an appropriate adapter and machine. For example, the message agent 210 can employ intelligence to facilitate selecting a suitable adapter and machine.

For sake of brevity and purposes of illustration, it can be assumed that the machines $230_1$-$230_M$ employ similar adapters $240_1$-$240_M$. However, it is to be appreciated that various other combinations can be employed in accordance with aspects of the present invention. For example, one or more of the adapters $240_1$-$240_M$ can be similar and/or different. The invoked machine (e.g., via direct and through the message agent 210) from machines $230_1$-$230_M$ can convey information related to itself and/or its adapter identity, such as a GUID, for example, to the message agent 210. The message agent 210 can utilize such information to facilitate establishing a connection between the client and the machine or the client and a different machine employing the adapter, where it is determined that the message should be retrieved via the different machine. For example, the message agent 210 can change the machine based on machine processing load, capacity and power, and expected future load, and/or where the originally selected machine has become inoperable or unable to pull the message.

The message agent 210 can employ the machine and/or adapter identity to generate the connection instance 250 and associate the connection instance 250 with one or more of the adapters $240_1$-$240_M$ and one of the machines $230_1$-$230_M$. For example, the message agent 210 can populate the connection instance 250 with the machine identity and the adapter identity. In addition, the message agent 210 can populate the connection instance 250 with information indicative of the client to connect to and/or the message to pull. Moreover, the connection ID (e.g., keep-alive message) can be stored within the connection instance 250. Such ID can be utilized to provide a particular machine with access to the connection instance 250 and the client so that only one machine can pull the message from the client at any given time. However, it is to be appreciated that in other aspects of the present invention that multiple machines can concurrently pull similar and/or different portions of the message. For example, the message can be pulled by two machines wherein the pulled messages can be compared and utilized for error checking. In another example, a parallel pulling technique can be employed wherein the message is divided into more than one section where respective sections are serially and/or concurrently pulled by different machines.

The message agent 210 can associate the connection instance 250 with the selected machine and provide such machine with the connection ID. This machine can utilize the connection ID to lock the connection with the client and the connection instance 250 and pull the message through a respective API (e.g., one of the APIs $260_1$-$260_M$). Thus, only this machine can access and update the information within the connection instance 250 and pull the message. As depicted, the connection instance 250 is associated with adapter $240_1$ of machine $230_1$ and API $260_1$. Upon such association, the adapter $240_1$ and/or the machine $230_1$ can lock the connection instance 250 and/or the connection and begin pulling the message from the client through the API $260_1$.

As described previously, message retrieval can be achieved via streaming and/or bursting the message and/or one or more data packets associated with the message. As a stream and/or burst of data is pulled, the adapter $240_1$ and/or the machine $230_1$ can concurrently update the connection instance 250. For example, the adapter $240_1$ and/or the machine $230_1$ can send information related to the portion of the message being transferred as well as information related to whether retrieval and/or saving were successful (e.g., acknowledgements and non-acknowledgements). Thus, for a particular message portion, the connection instance 250 can be updated to reflect the present state of the transmission and to track transmission. Message retrieval can continue until the transmission is halted and/or terminated. For example, message transmission can stop due to completion of message retrieval, transmission error (e.g., due to the client, the adapter and the machine), transmission pauses, lapsed time-out, and connection floating.

The foregoing approach to pulling messages provides for reliable and efficient message retrieval with error recovery. For example, the connection ID can be utilized to ensure reliability of message transmission. For example, if the adapter $240_1$ and/or the machine $230_1$ were to become inoperable, the message agent 210 can deliver the connection ID to one of the machines $230_2$-$230_M$ and/or adapters $240_2$-$240_M$, wherein that machine would own the lock on the connection instance 250 and the connection with the client and can continue pulling the message. Thus, the present invention can float the connection as needed via the connection ID in order to ensure that the message is retrieved.

Error recovery can also be provided via the information stored within the connection instance 250. For example, if the connection should fail (e.g., due to crash, power cycle, reboot, etc.) the connection ID can be floated by the message agent 210, as described above. In addition, the machine receiving the connection ID can extract progress and history from the connection instance 250 to determine what has been successfully received and what still need to be retrieved. Thus, rather than re-pulling data that has already been retrieved, the new machine can begin pulling the information that still needs to be retrieved. In addition, the new machine can verify that such information has been successfully retrieved and stored and can resubmit acknowledgements to the connection instance 250.

Efficiency can be maintained via floating the connection across the machines $230_1$-$230_M$. For example, a transmission interval that specifies a time duration can be employed to define the length of time for any given retrieved stream and/or burst. Thus, when a connection ID is delivered to a machine and/or adapter, a timer can be invoked that releases the connection ID and/or lock upon a time lapse. In other aspects of the present invention, the release can be triggered by a quantity of message transferred, the load of the machine and/or based on an intelligent decision. The message agent 250 can facilitate determining which machine should resume message retrieval, wherein the message agent 250 can deliver the connection ID to. such machine, which can utilize the connection ID to lock the connection instance 250 and connection path. The new machine can access the connection instance 250 to obtain information related to the message being retrieved and the next portion to be retrieved. Similar to the machine initiating message pulling, the new machine can update the connection instance 250 during streaming and/or bursting information. The connection can be floated as often as desired and to as many machines that employ a suitable adapter.

It is to be appreciated that the system 200 can be utilized in connection with service windows. For example, if service windows are to be used, the connection ID can be associated with a service window, and after processing, the adapter can delete the connection ID and create a new connection ID with the next service window.

Moreover, it is to be appreciated that the client can initiate the connection with machines $230_1$ (or any one of the machines $230_1$-$230_M$) and push data through the API $260_1$ and adapter $240_1$. For example, the client can request a connection with the adapter $240_1$. The connection initiation can include conveying information such as client identity, data identity, a particular machine, a suitable adapter, a time-out, and a subscriber(s). As depicted, adapter $240_1$ within machine $230_1$ is servicing the client; however, it is to be appreciated that in other aspects of the invention, a different adapter and/or machine can be utilized, for example, based on intelligent decision, machine load, capacity and processing power.

Once the adapter $240_1$ is invoked, a technique similar to the pulling approach described herein can be employed to receive pushed data. For example, the connection instance 250 can be generated and populated. The connection instance can be provided to the machine $230_1$, which can lock the connection and connection instance. Upon locking the connection and connection instance, the adapter $240_1$ can begin receiving pushed data and updating the connection instance (e.g., status). In addition, reliability and efficiency (e.g., load balancing), error recovery, service windows can be supported.

Figure 3:
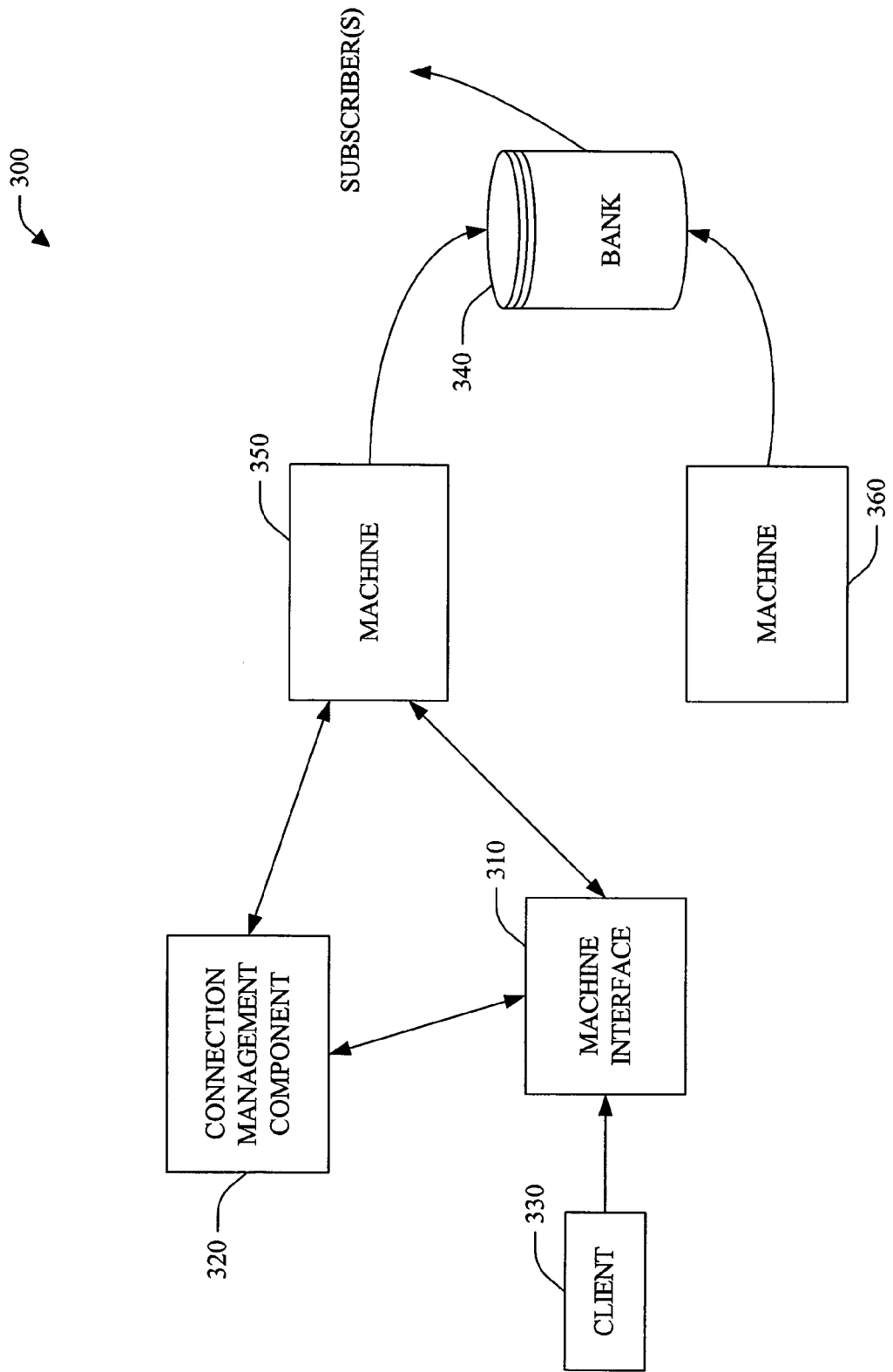
FIG. 3 illustrates an exemplary system that employs a connection management component that facilitates receiving messages pushed by a client, in accordance with an aspect of the present invention.

FIG. 3 illustrates a system 300 that pushes a message from a client to a databank, in accordance with an aspect of the present invention. The system 300 comprises a machine interface 310 that provides a gateway to various machines, and a connection manager 320 that coordinates data transmission with the machines and provides connection-related information.

A client 330 can push data to a bank 340 by establishing a connection with the machine interface 310 (e.g., an API). In one aspect of the present invention, the client 330 can provide information related to a suitable adapter and/or a particular machine. Such adapter information can be utilized to identity which machines (e.g., a machine 350 and a machine 360) can service the client 330 and the machine information can be utilized to specify a desired machine. It is to be appreciated that the machine interface 310 can invoke the desired machine and/or a different machine. For example, it can be determined that the connection should be initiated with a different machine based on machine load, capacity and processing power.

As depicted, the client 330 connected with the machine 350. Upon such connection, the machine 350 can convey machine and/or adapter identity to the connection manager 320. It is to be appreciated that the connection manager 320 can substantially similar to the connection management component 120 and the message agent 210. As such, the connection manager 320 can employ at least one of the identities to generate an instance for the connection. This instance can include information related to the client 330, the machine interface 310, the machine 350 and the adapter. In addition, the instance can store information related to the data being pushed, the progress of the data being pushed, and connection indicia (e.g., keep-alive message). In one aspect of the present invention, the instance can be maintained by the connection manager 320, wherein the connection manager 330 can provide a mechanism to access the instance in order to obtain and/or update the information included therein.

The connection manager 330 can provide the selected machine, for example, machine 350, with access to the instance, including the connection indicia. The machine 350 can utilize such information to lock the instance and the connection and begin receiving data pushed by the client 330 through the machine interface 310. It is noted that only the machine that owns the lock on the connection can receive data from the client 330 and access the information within the instance. Data can be pushed by the client 330 as a stream of data and/or as one or more data packets (e.g., via a burst). As the client 330 pushes data, the instance can be dynamically updated to reflect the present state of data exchange. For example, the machine 350 can convey information to the connection manager 330, wherein the information can be related to the data being received, for example, whether the machine successfully received and stored such data in the bank 340 or whether the transmission failed. The information can include an identification corresponding to the data under transmission and the status of storage of such data (e.g., an acknowledgement and a non-acknowledgement). This information can be stored within the instance to refresh the instance with data that reflects the present state of the data exchange. The client 330 can continue pushing data until the connection is halted and/or terminated.

Similar to the pulling approach described previously, the pushing approach described herein provides for reliable and efficient data exchange with error recovery. For example, the connection indicia can be utilized to re-establish a connection. For example, if the connection between the client 330 and the machine 350 were to break, the information within the instance be extracted and utilized to re-establish the connection, including identifying the machine that was servicing the client 330, the data that was being conveyed, and the data that was successfully received and stored. The machine can begin to receive the pushed data. In addition, information related to the severed and/or the re-established connection can be stored in the instance. In another instance, the connection indicia can be utilized to float the connection to another machine. For example, if the connection were to break the connection management component 320 can determine an alternate machine that can service the client 330 and invoke delivery of the connection indicia to that machine, which would now own the instance lock and data exchange connection and would receive the data being pushed by the client 330.

In addition, the lock on the connection and the instance can be voluntarily released by the machine, for example, based on lapse of a time, a load threshold, and/or retry threshold. The released lock can be picked up by another machine, for example, by a machine receiving the connection indicia from the connection management component 320.

In other aspects of the present invention, intelligence can be utilized to facilitate determining when the lock should be released. The machine receiving the connection indicia can access the instance to obtain information related to the data being retrieved and the next portion to be retrieved. The new machine can update the instance upon successful retrieval and storing of any stream and/or burst of data. The connection can be floated as often and to as many machines as desired. In addition, the system 300 can be utilized in connection with service windows, wherein the connection ID can be associated with a service window during processing and deleted upon processing completion. A new connection ID can be created and associated with the next service window.

It is to be appreciated that one or the machines 350 and 360 can initiate a connection with the client 330 and pull data through the machine interface 310. For example, one of the machines can be invoked to retrieve data from the client 330. Invocation can include providing the machine with information such as client identity, data identity, a data transfer condition, a time-out, and a subscriber(s). As depicted, machine 350 is servicing the client 330; however, it is to be appreciated that in other aspects of the invention, machine 360 can be selected and utilized, for example, based on an intelligent decision, machine load, capacity and processing power.

Once machine 350 is invoked, a technique similar to the pushing approach described above can be employed to pull data. For example, a connection instance can be created and initialized. The connection instance can be provided to the machine 350 and utilized to lock the connection and connection instance (e.g., via the connection management component 320 and the machine interface 310). Upon locking the connection and connection instance, the interface component 310 can begin pulling data, wherein the connection can be maintained and/or floated to provide for load balancing, error recovery and efficiency, and the connection instance can be concurrently updated upon successful and/or unsuccessful pulling and storing of data. Stored data can be retrieved by components subscribed with the storage medium (e.g., a message box that is utilized to save the pulled data).

Figure 4:
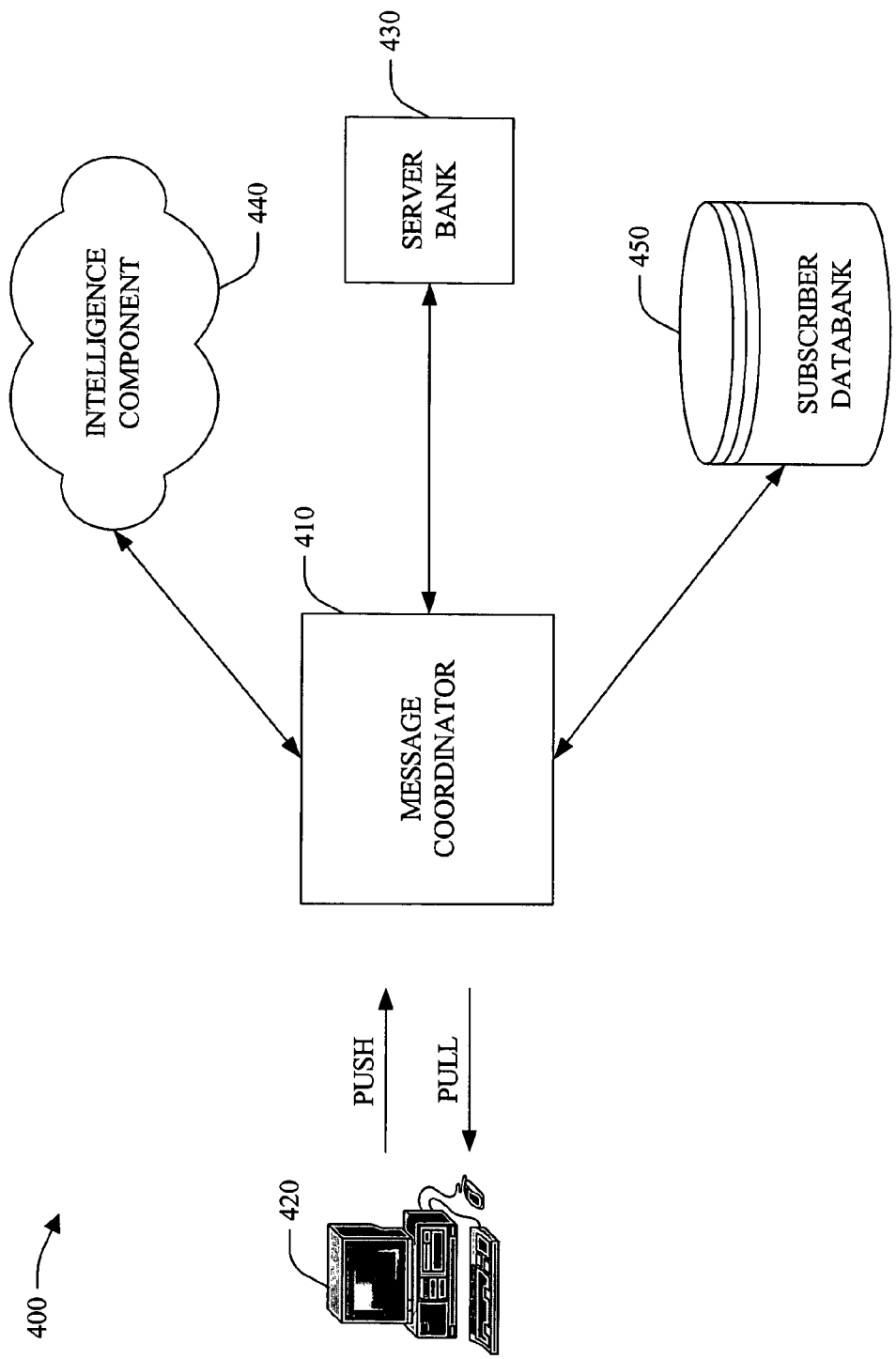
FIG. 4 illustrates an exemplary system that utilizes intelligence to facilitate message retrieval and/or reception from a client, in accordance with an aspect of the present invention.

FIG. 4 illustrates a system 400 that can push and/or pull one or more messages from a client, in accordance with an aspect of the present invention. The system 400 comprises a message coordinator 410 that floats a connection (e.g., intranet, internet and the Internet) between servers, or machines employing a suitable adapter. The message coordinator 410 can be invoked be the client 420 and/or a server within the server bank 430, as described in detail above. For example, the client 420 can request a connection with an adapter and/or a particular server within the server bank 430. Such request can be in the form of a direct request for such an entity and/or a message being pushed via a communication protocol, wherein the message coordinator 410 can determine the protocol, for example, via an intelligent component 440 and select a server with a suitable adapter that employs the protocol. In addition, other information such as server load, capacity and/or processing power can be employed to facilitated server selection.

In another example, a server within the server bank 430 can transmit a message to the message coordinator 410, wherein the message can be a request to open a connection with the client 420 in order to pull information from the client 420. Such request can specify a desired server, the communication protocol, and/or the client 420. This information can be employed by the message coordinator 410 in connection with the intelligence component 440 to select the server that will be employed to initialize the connection. In addition, other information such as server load, capacity and/or processing power can be employed to facilitate server selection. The selected server can be utilized to open the connection and begin message exchange.

After receiving a request for a connection, the message coordinator 410 can initialize connection-related information associated with the client, the server, the server adapter, the message(s), the connection, message exchange criteria, and/or transmission status, for example. Message exchange criteria can include information regarding when and how long to a particular server should be employed to receive (e.g., pushed and pulled messages) at least a portion of a message from the client. Such criteria can be based on time duration, a window of time, a server load and/or a quantity of message successfully received. In addition, the intelligence component 440 can facilitate determining such criteria, for example, to optimize time, minimize power consumption, balance processing load, to mitigate anticipated problems, etc. The criteria can be employed to commence, pause, resume and/or terminate message transmission. Transmission status can include information that identifies successfully received messages (as described above), the next message to push/pull, and information that identifies messages that are likely to fail, for example, due to the size of the message, the time of day, the fidelity of the communication path, the sensitivity of the message content, etc.

At least a portion of the connection-related information can be conveyed to the server that is selected to begin communication. The intelligence component 450 can facilitate determining what, if any, of the connection-related information should be conveyed to the server. Typically, at least a connection identity, such as a keep-alive message, is provided to the server. Such information can enable the server to lock the connection-related information and the communication path. When locked, only the server can access the connection-related information and participate in message exchange. The server can then extract further information from the connection-related information and/or employ the intelligence component 440 in order to begin message exchange.

When the client 420 initiates the connection, the client typically pushes messages to the server through the message coordinator 410, and when a server initiates the connection, messages typically are pulled from the client through the message coordinator 410. However, it can be appreciated that the client 420 can initiate a connection wherein messages are pulled and a server can initiate a connection wherein the client 420 pushes messages. Pushing and/or pulling messages can include exchanging data as a stream and/or a burst such as a packet of data.

With both techniques, messages can be stored within a message box in the subscriber bank 450. Message storage can be facilitated by the intelligence component 440 to provide for an ordered and/or intelligent approach. For example, messages can be grouped based on time of storage and/or protocol, read/write privileges can be defined to provide selective access by subscribers. A message older than a specified length of time can be automatically flushed and/or utilized to invoke the system to retrieve updated data. The messages stored within the subscriber bank 450 typically can be retrieved by any component (not shown) subscribed to access messages from the message box.

As messages are stored within the subscriber bank 450, the connection-related information can be concurrently updated to provide current information. For example, the message coordinator 410 can update the connection-related information to reflect the present state of conveyance. For example, when a transmission fails, information that can be utilized to identify the data can be stored within the connection-related information. Such information can be utilized to re-submit the transmission, for example, by the same server or another server. For example, the intelligence component 440 can utilize the connection-related information along with server load, expected future load, various message characteristics, for example, to determine which server should be utilized during the re-submission. In addition, when a transmission succeeds, the connection-related information can be updated to mitigate re-submission of successfully received messages and to provide a history of the communication. Furthermore, the connection-related information can be updated to lock/unlock the connection, indicate that information conveyance is complete, and indicate that conveyance was terminated, including providing a termination reason.

It is to be appreciated that both the pull and push approaches described above can additionally include capabilities to ensure reliability and efficiency, provide for error recovery and/or accommodate utilization of service windows, as described previously. For example, reliability and error recovery can be achieved through the information stored in the connection-related information and facilitated via the intelligence component 440. Thus, if a connection were to terminate and/or a transmission were to fail, the connection-related information can be accessed to determine the client, the server, the protocol, any message that was successfully obtained, and any message that still needs to be obtained. Such information can be utilized to restore the connection and continue message exchange with the same and/or another server. If the sever servicing the connection were to become inoperable such that it could not be utilized to restore the connection, another sever employing a suitable adapter can be selected, for example, via the intelligence component 440, wherein the server can be granted ownership to the connection lock and can facilitate message conveyance.

Efficiency can be achieved by enabling servicing by a plurality of servers within the sever bank 430. For example, a load associated with message conveyance can be distributed across servers to balance processing and to determine when and if a present server should continue conveyance or whether the connection should be floated to another server. If the connection is floated, the new server can access the connection-related information in order to resume conveyance where it was suspended.

It is to be appreciated that the intelligence component 440 can employ statistics, inferences, probabilities and classifiers (e.g., explicitly and implicitly trained), including but not limited to, Bayesian learning, Bayesian classifiers and other statistical classifiers, such as decision tree learning methods, support vector machines, linear and non-linear regression and/or neural networks.

FIGS. 5-9 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Figure 5:
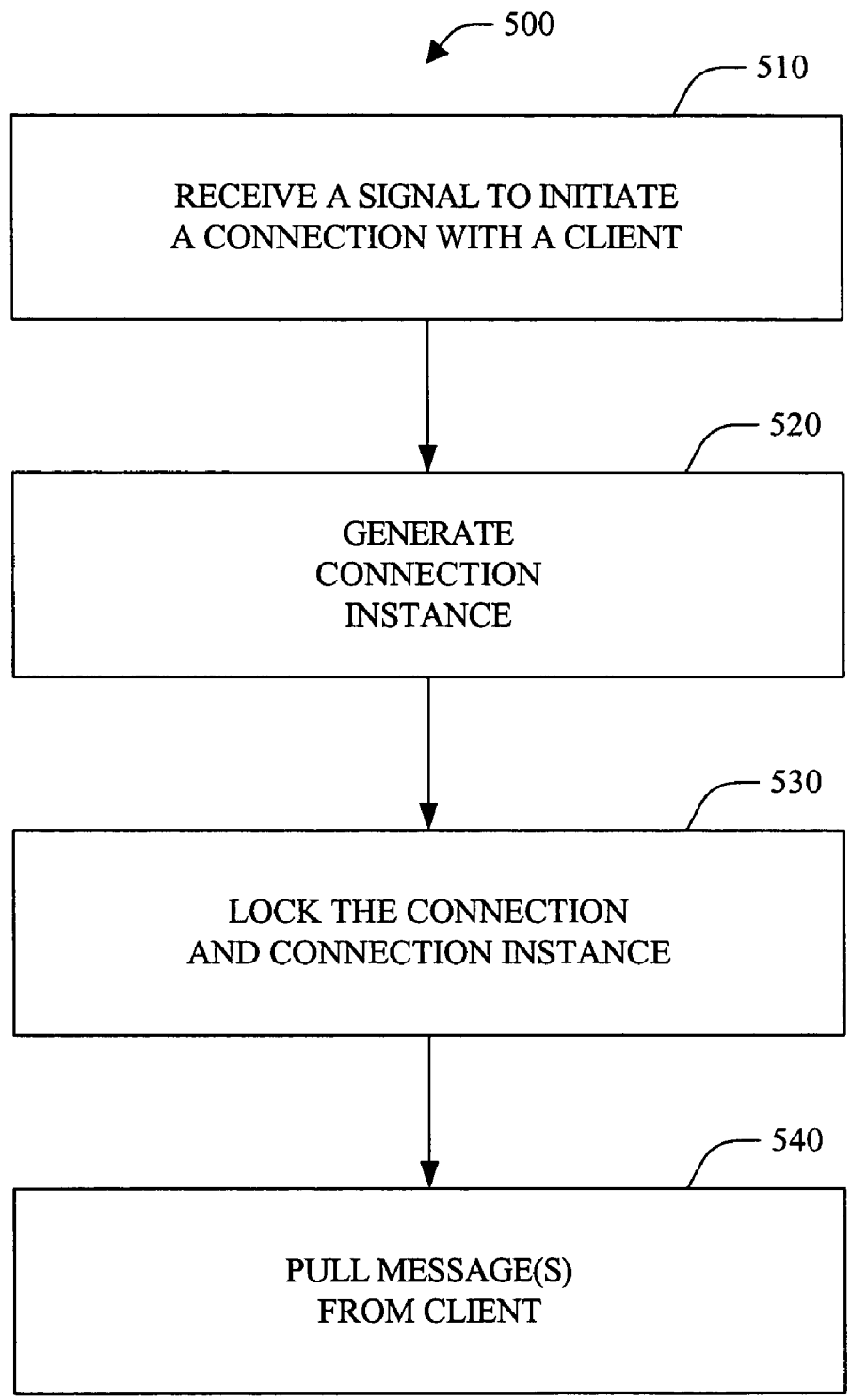
FIG. 5 illustrates an exemplary method that employs a connection instance to facilitate reception of messages pushed by a client, in accordance with an aspect of the present invention.

Referring initially to FIG. 5, a methodology 500 that facilitates pulling information from a client is illustrated in accordance with an aspect of the present invention. Proceeding to reference numeral 510, a signal is received that indicates a connection with a client should be established. Such a signal can originate from a database and/or a database subscriber and can include information indicating at least one of a particular machine that should initiated the connection, a suitable adapter that can pull information, the client, a data retrieving condition(s), a time-out, the database, the subscriber, and a storage location for to save retrieved information.

If the signal includes the adapter type and/or the machine that should initiate the connection, the signal typically is provided to the machine and/or adapter to invoke the machine and/or adapter to initiate the connection. However, it can be appreciated that a different adapter and/or machine can be utilized, for example, based on machine load, capacity and processing power. For example, intelligence can be employed to facilitate determining whether the adapter and/or machine indicated in the signal is suitable and/or preferred or if another adapter and/or machine would be a more efficient choice. If such information is not available in the signal, intelligence can be employed to select an adapter and/or machine from a plurality of adapters and machines, for example, based on machine load, capacity and processing power as well as history, statistics, probabilities, classifiers, and inferences.

An invoked adapter within a machine can convey a unique identity associated with the adapter and/or machine, as well as any of the information within the connection-originating signal, to a message agent. At reference numeral 520, the message agent can employ this information to generate a connection instance, which can include connection-related information such as a data transfer condition(s), data identification, data transfer status, and data transfer and connection privileges, for example. In general, data transfer conditions can include information regarding when and how long to exchange data. For example, data transfer conditions can define a window within which and/or a time duration in which data can be transferred, and/or a machine load threshold. Such conditions can be employed to commence, pause, resume and/or halt data transfer, for example, in order to load balance across machines employing the adapter.

Data identification can be utilized to identify the data being transferred. Data transfer status can be utilized to indicate whether information and/or portions thereof have been successfully received and stored, for example during data streaming and/or bursting files and/or data packet. Any known means to indicate such status, for example, ACKs and/or NAKs, can be utilized in accordance with an aspect of the present invention. Data transfer status and data identification can be utilized together to identify the information being conveyed and locate the portion of information presently being transferred. Read/write privileges can be utilized for selectively providing access to the connection instance and client during data transfer. Thus, the machine can lock the connection instance and/or connection such that the machine is the only machine that can access the connection instance and facilitate data transfer. In addition, the privileges can be configured to enable other machines and/or clients the ability to monitor progress, evaluate performance and render decisions regarding future processing.

In addition, a connection identifier (e.g., a keep-alive message) can be associated with connection instance. At reference numeral 530, at least a portion of the session-related information and the connection identifier can be conveyed to the message agent. The message agent can employ the connection identifier to lock the connection instance so that only the machine holding the lock can access (e.g., retrieve, remove and write) the information within the connection instance. Furthermore, the connection identifier can be utilized to lock the connection so that only the machine holding the lock can pull data from the client. Moreover, the connection identifier can be utilized to ensure reliability, recover from errors, load balance and facilitate service windows, as described in detail herein.

At reference numeral 540, the machine owning the lock on the connection and connection instance can commence pulling data from the client. As briefly noted above, pulling data can include pulling streams and/or packets of data. As data is pulled, the message agent can be utilized to facilitate updating the connection instance. For example, upon successfully and/ or unsuccessfully pulling, the message agent and/or adapter can update the connection instance to reflect the present state of conveyance. For example, a NAK can be delivered when a transmission fails such that the status indicates that the transmission was attempted and failed and an ACK can be delivered when a transmission succeeds such that the status indicates that the transmission was attempted and succeeded. In addition, the connection instance can be updated to indicate data conveyance is complete or that conveyance was halted, including providing a reason for halting conveyance.

Figure 6:
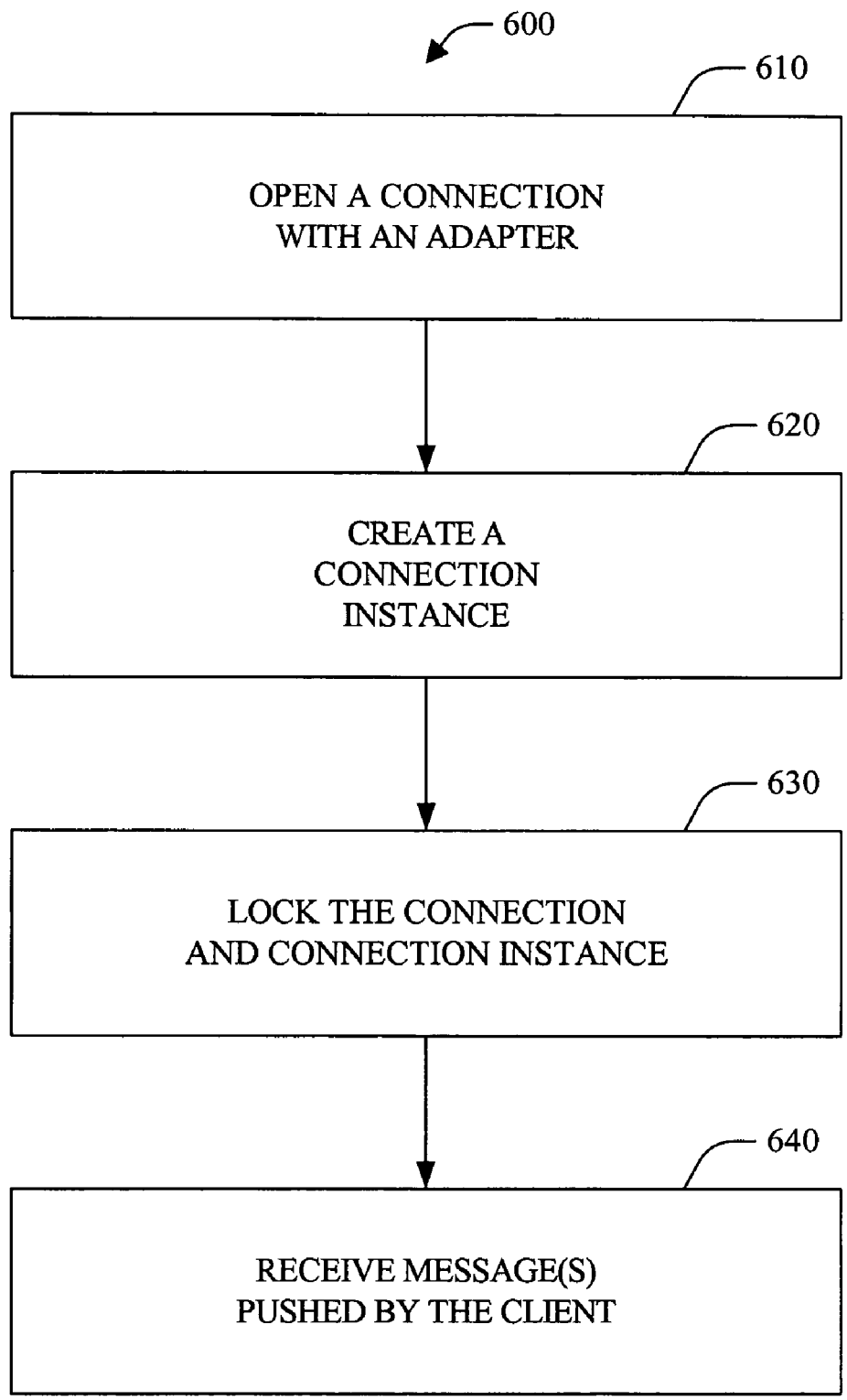
FIG. 6 illustrates an exemplary method that employs a connection instance to facilitate pulling messages from a client, in accordance with an aspect of the present invention.

FIG. 6 illustrates a methodology 600 that facilitates pushing data from a client, in accordance with an aspect of the present invention. Referring initially to reference numeral 610, a client initiates (e.g., request) a connection with an adapter and/or a machine employing a suitable adapter. The connection initiation can include conveying information such as client identity, data identity, a particular machine, a suitable adapter, a time-out, and a subscriber(s). If a particular machine and/or adapter is provided, the desired machine and/or adapter can be invoked or a different adapter and/or machine can be utilized, for example, based on machine load, capacity and processing power. For example, intelligence can be employed to facilitate determining whether the adapter and/or machine indicated should be utilized or whether a different adapter and/or machine improve efficiency and/or performance, for example. If the client does not provide such information, intelligence can be employed to select an adapter and/or machine from a plurality of adapters and machines, for example, based on machine load, capacity and processing power as well as history, statistics, probabilities, classifiers, and inferences.

As described above, an invoked adapter can convey a unique identity associated with the adapter and/or machine, as well as any of the information within the connection-originating signal, to a message agent. At reference numeral 620, the message agent can employ this information to create a connection instance. The connection instance can be populated with information received from the client, such as data identification, as well as a data transfer condition(s), data transfer status, data transfer and connection privileges, and connection identity, for example. As noted previously, data transfer conditions can include information regarding when and how long to exchange data and can be utilized to commence, pause, resume and/or halt data transfer, for example, in order to load balance across machines employing the adapter.

Data identification can be utilized to identify the data being transferred and data transfer status can be utilized to indicate whether information and/or portions thereof have been successfully received and stored, for example during data streaming and/or bursting files and/or data packet. As noted above, any known means that can indicate status, such as ACKs and/or NAKs, can be utilized in accordance with an aspect of the present invention, and data transfer status and data identification can be utilized together to identify information being conveyed and locate the portion of information presently being transferred. Read/write privileges can be utilized to provide selective access to the connection instance and client during data transfer. Connection identity (e.g., a keep-alive message) can be associated with connection instance and utilized to track and float the connection, for example, to provide for data transfer reliability and error recovery, balance processing load and facilitate service windows, as described in detail below.

At reference numeral 630, at least a portion of such can be conveyed to the message agent. The message agent can employ the connection identifier to lock the connection instance so that only the machine holding the lock can access (e.g., retrieve, remove and write) the information within the connection instance and receive data pushed by the client. Hence, only the machine holding the lock can receive pushed data and update the connection instance. However, it is to be appreciated that the lock can be floated, as described below, and that other machines and/or clients can be enabled to monitor data transfer progress, evaluate data transfer performance and render decisions regarding future transfers.

At reference numeral 640, the machine owning the lock on the connection and connection instance can begin receiving pushed data from the client. As briefly noted above, pushing data can include pushing streams and/or packets of data. As data is received, the message agent can be utilized to facilitate updating the connection instance. For example, upon successfully receiving and storing data, the message agent and/or adapter can update the connection instance to reflect the present state of conveyance. For example, a NAK can be delivered when a transmission fails such that the status indicates that the transmission was attempted and failed and an ACK can be delivered when a transmission succeeds such that the status indicates that the transmission was attempted and succeeded. In addition, the connection instance can be updated to indicate data conveyance is complete or that conveyance was halted, including providing a reason for halting conveyance.

Figure 7:
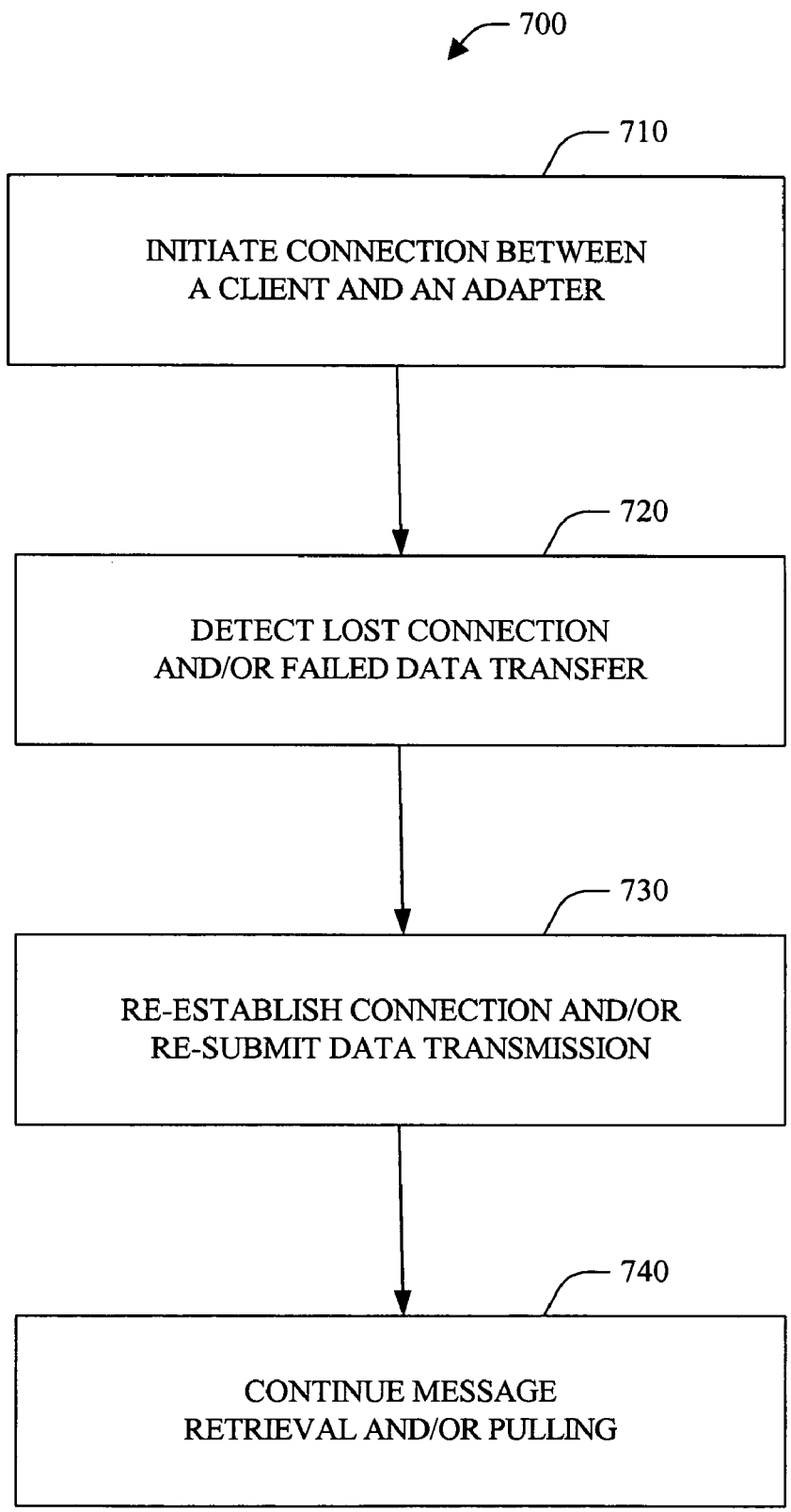
FIG. 7 illustrates an exemplary method that re-establishes a connection lost during message retrieval from a client, in accordance with an aspect of the present invention.

FIG. 7 illustrates a methodology 700 that facilitates re-establishing a lost connection, in accordance with an aspect of the present invention. At reference numeral 710, a client, a subscriber or database initiates a connection between the client and an adapter (e.g., via an API) as described in detail above. Data is pulled or pushed from the client and stored within a message associated with the database and the connection instance is concurrently updated to reflect the present state of data conveyance.

At reference numeral 720, a lost and/or a data transfer failure is detected. The lost connection and/or failed data transfer can be associated with a lapse of a time-out, a severed connection, an API failure, an adapter failure, a machine failure, and a client failure, for example. Upon sensing the lost connection or failed transfer, a message agent can access the connection instance to obtain at least one of the connection identity, the client, the adapter, the machine, that status, and data transfer progress, for example. Thus, when a connection is lost or data fails to be transferred, the system is able to track the progress of the data transfer. For a lost connection, the information extracted from the connection instance can be utilized to attempt to re-establish the connection at 730. For example, the connection identity can be utilized to enable the same or a different machine to own the connection. For a failed data transfer, the information extracted from the connection instance can be utilized to attempt to re-submit the transfer at 730.

At 740, a re-established connection can be utilized to continue facilitating data transfer, for example, resuming where data transfer was terminated or a re-submission can be invoked. The foregoing provides for data transfer reliability, wherein the information within the connection instance can be utilized to continue data transfer after a failure. Conventional systems typically fail the data transfer request, wherein a new connection is established and the data is re-transferred. Thus, the present invention provides a novel technique to resume data transfer and mitigates the need to establish a new connection and re-submit already transferred data.

Figure 8:
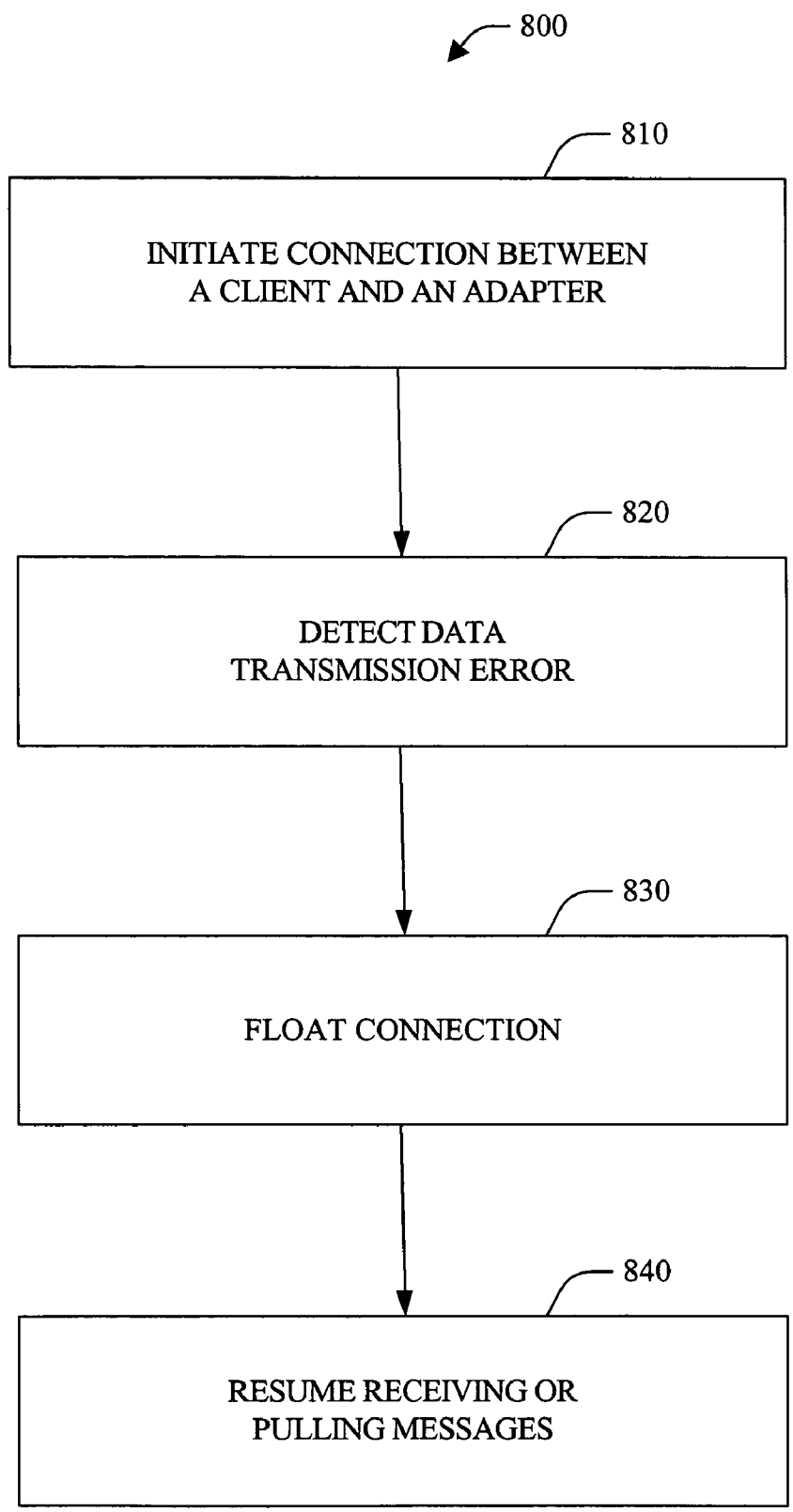
FIG. 8 illustrates an exemplary error handling method utilized to recover from errors occurring while receiving and/or pushing messages from a client, in accordance with an aspect of the present invention.

FIG. 8 illustrates a methodology 800 that facilitates error recovery, in accordance with an aspect of the present invention. At reference numeral 810, a client, a subscriber or database initiates a connection between the client and an adapter (e.g., via an API) as described in detail above. Data can be pulled or pushed from the client and stored within a message associated with the database and the connection instance is concurrently updated to reflect the present state of data conveyance.

At 820, an error that terminates data transfer and/or the connection is detected. The error can be associated with a severed connection, an API failure, an adapter failure, a machine failure, and a client failure, for example. Upon sensing the error, a message agent can access the connection instance to obtain at least one of the connection identity, the client, the adapter, the machine, that status, and data transfer progress, for example. Thus, when an error occurs, the state of the transfer can be captured.

At reference numeral 830, the information within the connection instance is utilized to provide another machine with ownership of the locked connection and connection instance. For example, the protocol information stored within the connection instance can be utilized to determine which machines employ a suitable connection and which of the machines should be granted ownership of the lock. At 840, the new machine can access the information within the connection instance in order to determine the identity of the data being transferred and to determine where data transfer is to be resumed, if at least a portion of the data has already been successfully received and stored.

Figure 9:
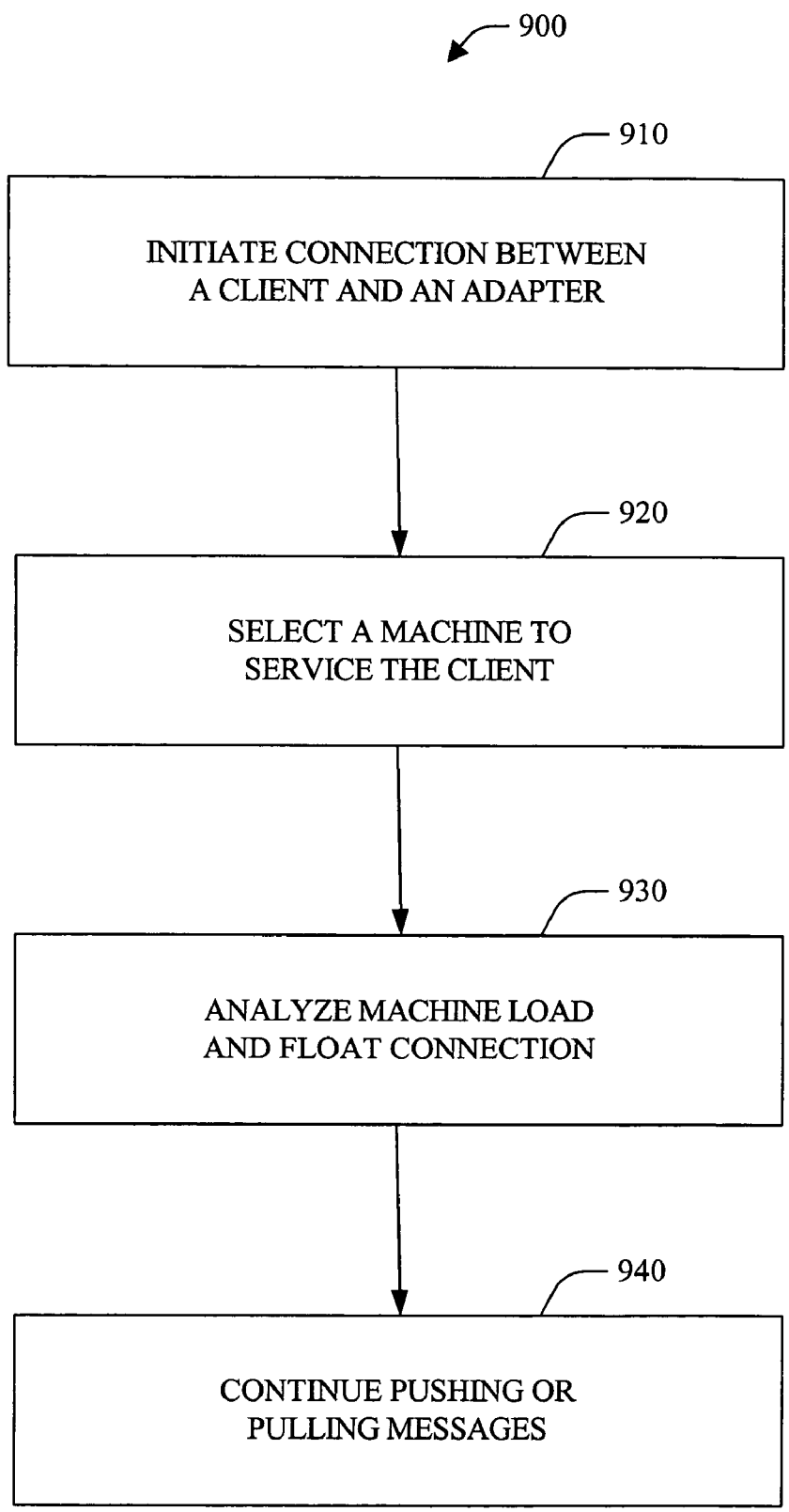
FIG. 9 illustrates an exemplary method that employs load balancing in connection with receiving and/or pulling messages from a client, in accordance with an aspect of the present invention.

FIG. 9 illustrates a methodology 900 that facilitates load balancing, in accordance with an aspect of the present invention. At reference numeral 910, a client, a subscriber or database can attempt to initiate a connection between the client and an adapter (e.g., via an API) as described in detail above. At 920, a machine that will be utilized to initialize the connection can be selected. Such determination can be based on a load balancing approach wherein a load associated with machines employing a suitable adapter can be analyzed to determine which machine should initialize the connection. Data is then pulled or pushed from the client and stored within a message associated with the database and the connection instance is concurrently updated to reflect the present state of data conveyance.

At reference numeral 930, a machine load associated with any machine that employs a suitable adapter can be monitored to determine whether the present machine owning the connection lock should continue pulling or receiving pushed data or whether the machine should voluntarily relinquish the lock so that another machine can lock the connection and connection instance and resume data transfer. In addition, information such as machine capacity and processing power can be determined and utilized to facilitate rendering a decision. Moreover, the foregoing information can be utilized in connection with intelligence to facilitate load balancing.

At 940, the machine selected to resume data transfer can be given the connection identity, which can be utilized to lock the connection and connection instance. The machine can then access the connection instance to determine where to resume data transfer. Data can then be pulled or pushed from the client and stored within a message associated with the database and the connection instance can be concurrently updated to reflect the present state of data conveyance. The foregoing provides for data transfer wherein data pulling and reception can be distributed across machines in order to balance the load across the machines and mitigate burdening any one machine.

Figure 10:
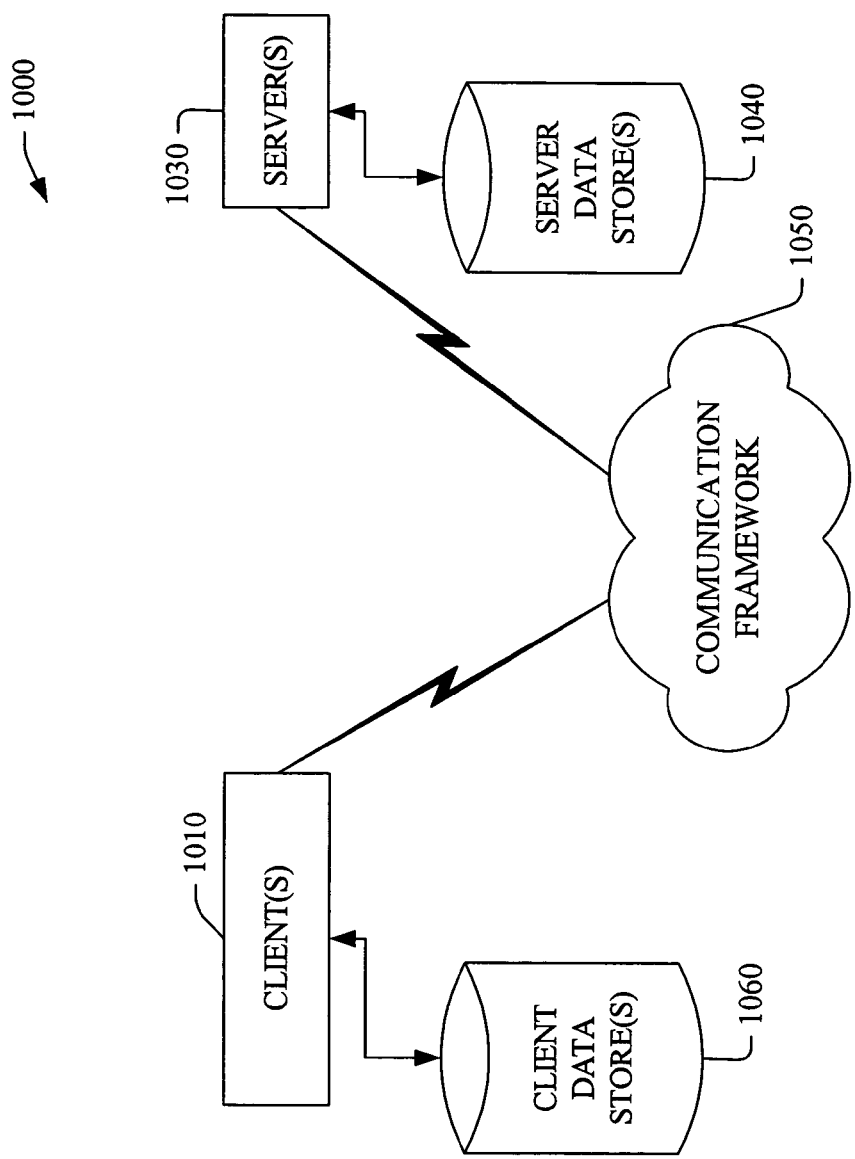
FIG. 10 illustrates an exemplary networking environment, wherein the novel aspects of the present invention can be employed.
Figure 11:
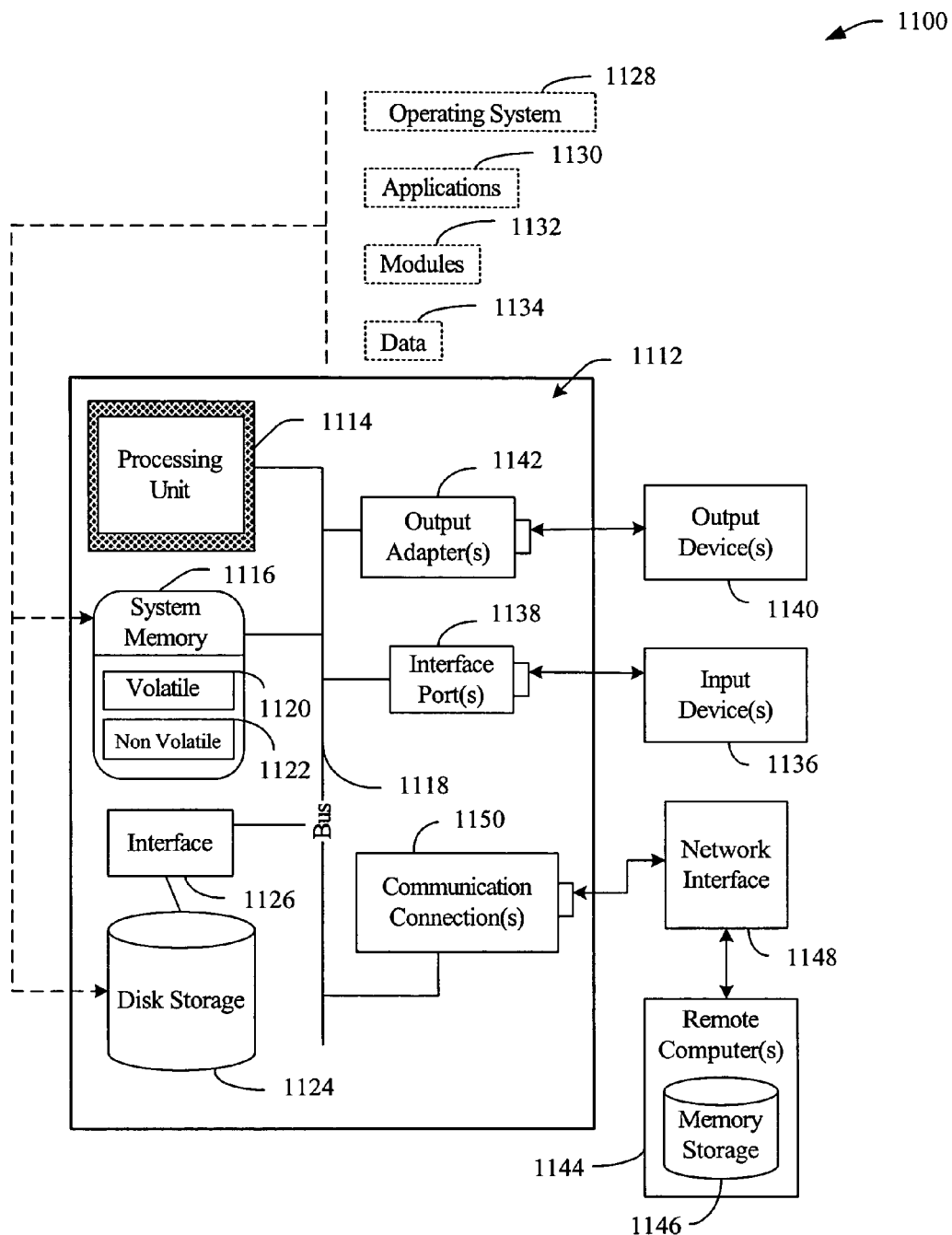
FIG. 11 illustrates an exemplary operating environment, wherein the novel aspects of the present invention can be employed.

In order to provide a context for the various aspects of the invention, FIGS. 10 and 11 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates data transfer from a remote component of a servicing device to a storage medium, comprising one or more processors executing the following components:

a connection management component that generates information for a connection with the remote component;

an information bank that stores the connection information comprising a present state of message conveyance, the message being conveyed and a connection instance ID; and an interface component that is concurrently employed by a plurality of servicing devices utilizes the stored connection information to lock the connection between the remote component and the storage medium, whereby other servicing devices are prevented from servicing the connection, and facilitate a push/pull data transfer between the remote component and the storage medium, wherein the interface component is configured to provide an acknowledgement (ACK) when the push/pull data transfer succeeds and/or a non-acknowledgement (NAK) when the push/pull data transfer fails such that the ACK and/or NAK can be utilized to determine whether to resubmit a particular data transfer, where to resume data transfer and/or whether transfer is complete, and wherein the interface is configured to dynamically update the connection information stored in the information bank concurrently with the transfer of data to the storage medium, thereby persisting a push/pull data transfer state within the connection information, such that upon determining that the connection has been disconnected or upon determining that the data transfer is to be load balanced between the plurality of servicing devices, the interface component voluntarily releases the lock on the connection and provides access to the connection information to float the connection among the plurality of servicing devices such that the persisted push/pull data transfer state is employed by at least a second servicing device to resume data transfer including the second servicing device locking the connection between the remote component and the storage medium, extracting push/pull data transfer state from the connection information to determine both the message being conveyed and the storage medium to which message conveyance is to be resumed, and continuing message conveyance.

2. The system of claim 1, the interface component employs one or more of the following connection protocols: TCP/IP; IPX/SPX; UPD/IP; FTP; HTTP; SOAP; or a proprietary protocol.

3. The system of claim 1, the data is transferred via the interface component by at least one of pulling data from the remote component or receiving data pushed by the remote component.

4. The system of claim 1, the data is transferred as one or more of the following: a stream; a file; one or more data packets; or one or more data bursts.

5. The system of claim 1, the connection information comprises data related to at least one of the following: the storage medium identity; an interface component identity; a remote component identity; a data receiving condition, a data transfer time-out, or a storage medium subscriber.

6. The system of claim 1, one of the plurality of servicing devices is provided with access to the connection information based at least in part on one or more of the following: a request for a particular servicing device; a present servicing device load; an expected future servicing device load; a servicing device capacity; or a servicing device processing power.

7. The system of claim 1, access to the connection information is floated between the plurality of servicing devices based at least in part on one or more of the following: a present servicing device load; an expected servicing device load; a servicing device capacity; a servicing device processing power; or an intelligent decision, in order to dynamically balance the transfer load across the plurality of servicing devices.

8. The system of claim 1, the overloaded servicing device recovers from a voluntarily or involuntarily terminated connection by voluntarily floating access to the connection information to another servicing device.

9. The system of claim 1, the interface component provides the connection management component with information related to one or more of the following: the interface component; the servicing devices selected to initiate the connection; the remote component, a data receiving condition, a data transfer time-out, or a remote storage subscriber.

10. The system of claim 9, the information related to the interface component and the selected service device includes at least an identity of the interface component and an identity of the selected service device.

11. The system of claim 10, the identity of the interface component and/or the identity of the selected service device are utilized by the selected service device to lock the connection and connection information, wherein only the service device that owns the lock can facilitate data transfer from the remote component and update the connection information.

12. The system of claim 1, the interface component updates the data transfer state with information when a portion of data successfully or unsuccessfully is transferred.

13. The system of claim 1 is employed in connection with a service window.

14. The system of claim 1, the interface component is invoked to initiate a connection with the remote component by one or more of the remote component, the storage medium, or a device subscribed to retrieve data from the storage medium.

15. A method that facilitates data transfer from a client to a database, comprising:

generating a connection instance for a connection between the client and an adapter associated with the database, the connection instance stores at least information related to the state of the data transfer, one or more message and a connection ID transferring the data; concurrently receiving data and updating the connection instance with at least a present state of data transfer;

persistently storing the state of data transfer in the connection instance;

utilizing the persistently stored present state to lock the connection between the client and the adapter, whereby other servicing devices are prevented from servicing the connection, and facilitate a push/pull data transfer between the client and the adapter, wherein the interface component is configured to provide an acknowledgement (ACK) when the push/pull data transfer succeeds and/or a non-acknowledgement (NAK) when the push/pull data transfer fails such that the ACK and/or NAK can be utilized to determine whether to resubmit a particular data transfer, where to resume data transfer and/or whether transfer is complete, and wherein the interface is configured to dynamically update the connection information stored in the information bank concurrently with the transfer of data to the adapter, thereby persisting a push/pull data transfer state within the connection information, such that upon determining that the connection has been disconnected or upon determining that the data transfer is to be load balanced between the plurality of servicing devices, the interface component voluntarily releases the lock on the connection and provides access to the connection information to float the connection among the plurality of servicing devices such that the persisted push/pull data transfer state is employed by at least a second servicing device to resume data transfer including the second servicing device locking the connection between the client and the adapter, extracting push/pull data transfer state from the connection information to determine both the message being conveyed and the adapter to which message conveyance is to be resumed, and continuing message conveyance.

16. The method of claim 15 further comprises providing one of a plurality of machines employing the adapter with a keep-alive message associated with the connection instance, the machine receiving the keep-alive message locks the connection and connection instance and facilitates data transfer.

17. The method of claim 16 further comprises unlocking the connection and connection instance and floating the keep-alive message to another of the plurality of machines, the new machine receiving the keep-alive message locks the connection and connection instance and facilitates data transfer.

18. A method that facilitates transferring a message from a client to a database, comprising:
    invoking a client adapter coupled to the client;
    providing a machine employing the adapter with a connection instance identification identifying the connection between the client and an adapter associated with the database;
    employing the connection instance identification to concurrently receive data and update the connection instance with at least a present state of data transfer one or more message and a connection ID transferring the data;
    persistently storing the present state of data transfer in the connection instance;
    utilizing the persistently stored information within the connection instance to lock the connection between the client and the adapter, whereby other servicing devices are prevented from servicing the connection, and facilitate a push/pull data transfer between the client and the adapter, wherein the interface component is configured to provide an acknowledgement (ACK) when the push/pull data transfer succeeds and/or a non-acknowledgement (NAK) when the push/pull data transfer fails such that the ACK and/or NAK can be utilized to determine whether to resubmit a particular data transfer, where to resume data transfer and/or whether transfer is complete, and wherein the interface is configured to dynamically update the connection information stored in the information bank concurrently with the transfer of data to the adapter, thereby persisting a push/pull data transfer state within the connection information, such that upon determining that the connection has been disconnected or upon determining that the data transfer is to be load balanced between the plurality of servicing devices, the interface component voluntarily releases the lock on the connection and provides access to the connection information to float the connection among the plurality of servicing devices such that the persisted push/pull data transfer state is employed by at least a second servicing device to resume data transfer including the second servicing device locking the connection between the client and the adapter, extracting push/pull data transfer state from the connection information to determine both the message being conveyed and the adapter to which message conveyance is to be resumed, and continuing message conveyance.

19. The method of claim 18 further comprises populating the connection instance with at least one of the following: a connection identity; an adapter identity; a client identity; a data receiving condition, a data transfer time-out, and a database subscriber.

20. The method of claim 18, the connection identity is a keep-alive message.

21. A computer readable medium storing computer executable components to facilitate message conveyance between a client and an adapter, comprising:
    a connection management component that generates information for a connection with the remote component;
    an information bank that stores the connection information comprising a present state of message conveyance, the message being conveyed and a connection instance ID; and
    an interface component that is concurrently employed by a plurality of servicing devices utilizes the stored connection information to lock the connection between the remote component and the storage medium, whereby other servicing devices are prevented from servicing the connection, and facilitate a push/pull data transfer between the remote component and the storage medium, wherein the interface component is configured to provide an acknowledgement (ACK) when the push/pull data transfer succeeds and/or a non-acknowledgement (NAK) when the push/pull data transfer fails such that the ACK and/or NAK can be utilized to determine whether to resubmit a particular data transfer, where to resume data transfer and/or whether transfer is complete, and wherein the interface is configured to dynamically update the connection information stored in the information bank concurrently with the transfer of data to the storage medium, thereby persisting a push/pull data transfer state within the connection information, such that upon determining that the connection has been disconnected or upon determining that the data transfer is to be load balanced between the plurality of servicing devices, the interface component voluntarily releases the lock on the connection and provides access to the connection information to float the connection among the plurality of servicing devices such that the persisted push/pull data transfer state is employed by at least a second servicing device to resume data transfer including the second servicing device locking the connection between the remote component and the storage medium, extracting push/pull data transfer state from the connection information to determine both the message being conveyed and the storage medium to which message conveyance is to be resumed, and continuing message conveyance.

22. A system that facilitates data transfer from a remote device to a database, comprising:
    means for identifying a connection between the remote device and an adapter;
    means for locking the connection between the remote device and the adapter;
    means for receiving data from the remote device and storing the data in the database; and
    means for floating the connection between a plurality of machines employing the adapter to provide for at least one of data transfer reliability, error recovery and dynamic load balancing, wherein the floating comprises locking the connection between the client and the adapter, whereby other servicing devices are prevented from servicing the connection, and facilitate a push/pull data transfer between the client and the adapter, wherein the interface component is configured to provide an acknowledgement (ACK) when the push/pull data transfer succeeds and/or a non-acknowledgement (NAK) when the push/pull data transfer fails such that the ACK and/or NAK can be utilized to determine whether to resubmit a particular data transfer, where to resume data transfer and/or whether transfer is complete, and wherein the interface is configured to dynamically update the connection information stored in the information bank concurrently with the transfer of data to the adapter, thereby persisting a push/pull data transfer state within the connection information, such that upon determining that the connection has been disconnected or upon determining that the data transfer is to be load balanced between the plurality of servicing devices, the interface component voluntarily releases the lock on the connection and provides access to the connection information to float the connection among the plurality of servicing devices such that the persisted push/pull data transfer state is employed by at least a second servicing device to resume data transfer including the second servicing device locking the connection between the client and the adapter, extracting push/pull data transfer state from the connection information to determine both the message being conveyed and the adapter to which message conveyance is to be resumed, and continuing message conveyance.

* * * * *